Patented Jan. 25, 1944

2,340,259

UNITED STATES PATENT OFFICE 2,340,259

CURING POLYVINYL BUTYRAL

La Verne E. Cheyney, Akron, Ohio, assignor to Wingfoot Corporation, Akron, Ohio, a corporation of Delaware No Drawing. Application January 23, 1943, Serial No. 473,423

3 Claims. (Cl. 260—73)

This invention relates to the curing of polyvinyl butyral by reaction with an alkyl-paratoluene sulfonate. The curing action renders the polyvinyl butyral less thermoplastic and much less soluble in organic solvents.

Polyvinyl butyral is becoming well known commercially. It is produced by several processes, e. g., by the condensation of butyraldehyde with a partially hydrolyzed polyvinyl ester, such as polyvinyl acetate. Ordinarily, it is only partially converted to the butyral and contains perhaps 20 per cent of unreacted hydroxyl as well as about 2 per cent of the ester. Both the polyvinyl butyral produced by Monsanto Chemical Company and known as Butvar and that produced by Carbide and Carbon Chemicals Corporation and known as Vinylite XYSG have been cured as described herein. It is within the scope of this invention, however, to include any other commercial varieties, such as Butacite, produced by the E. I. du Pont de Nemours and Company.

Polyvinyl butyral has been used to some extent as a substitute for rubber, but its extreme thermoplasticity has made it unsatisfactory for a number of applications. According to this invention the thermoplasticity is reduced as well as the solubility, and the product is better adapted for various operations than the unreacted polyvinyl butyral. For example, it is more suitable for the production of raincoats, where the uncured resin is too thermoplastic, causing the raincoat to become stiff on only moderate cooling and soft and plastic on becoming somewhat warm. This resin has likewise found some use in the fabrication of inflatable products, such as bladders, where the resin possesses a low rate of permeability to the inflating gas. The plasticized compositions prepared from the uncured resin lose their resiliency rapidly on chilling, and they tend to flow too readily on warming. Curing the resin by the process of this invention leads to compositions which are much less sensitive to temperature changes and hence more satisfactory for such uses.

According to this invention the thermoplasticity and solubility in organic solvents of polyvinyl butyral are reduced by heating the resin with an alkyl-para-toluene sulfonate, the alkyl group containing five carbon atoms or less. The amount of the curing agent required depends upon the time and length of heating. As little as 1 to 2 per cent by weight is sufficient to bring about the reaction at 90° C. if heated for about five hours.

The use of a much larger amount of reagent, such as 25 per cent by weight, reduces the time necessary for the reaction to an hour or less at 90° C. The reaction is progressive in character, and products of different properties are, therefore, obtained by varying the time of the reaction.

The reaction may be carried out either in solution or in the dry state. When carried out in solution in certain solvents, such as ethylene dichloride, ethyl acetate, benzene-ethanol blends, etc., the reaction causes a gelation of the cement, although some cements do not gel, and this phenomenon is, therefore, not a necessary indication of the reaction. If the reaction is carried out in the dry state, the two materials may be mixed together on a rubber mill, for example, and then subjected to the action of heat in the presence or absence of pressure. For example, the reaction mixture may be heated in an open container, or it may be molded in a press.

The reaction is not one which proceeds to a definite point and then stops, but it appears that it continues as long as the reagent is present and the required temperature is maintained. For example, it may be continued until a product is obtained which is completely insoluble in ethylene dichloride and the other organic solvents in which the untreated material is soluble.

Sulfur determinations on the reaction product from which excess reagent had been removed indicate that there is a definite chemical combination of the reactant with the resin.

The product may be plasticized by adding a plasticizer either before, during or after the curing reaction. The unplasticized, cured product is more or less hard and horny, a yellow-brown color, and resembles balata in general appearance. Its softening point is higher than that of the original resin and is a function of the degree to which the curing reaction has taken place. By adding plasticizer, a flexible and rubbery product is obtained. Any of the normal plasticizers, such as dibutyl phthalate, dibutyl sebacate, methyl phthalyl ethyl glycollate, triacetin, etc., may be used.

The following examples illustrate the invention:

Example 1

To an 8.5 per cent solution of polyvinyl butyral in a 9:1 benzene:ethanol blend was added 2.5 per cent ethyl-p-toluene sulfonate (based on the resin). A film was spread from this cement and dried at 50° C. This film was heated for twelve hours at 90° C. At the end of this time it was hard and tough and was completely insoluble in organic solvents. A companion film prepared without the reagent was still completely soluble in solvents such as methanol or ethylene dichloride.

Example 2

To a 6 per cent solution of the resin in ethylene dichloride was added 30 per cent ethyl-p-toluene sulfonate, and the cement heated at 65° C. The cement gelled in about 60 minutes, whereas a companion cement without the reagent was still fluid. The dried gel was no longer soluble in the usual solvents for the resin although it was readily swollen. The excess reagent was removed from the dried product by extraction and the extracted product found to contain 0.3 per cent combined sulfur. The combination with the reagent had evidently started. The dried product could be rendered quantitatively insoluble by heating for several hours at 75–80° C. Similar results were obtained by using methyl-p-toluene sulfonate or n-butyl-p-toluene sulfonate instead of the ethyl compound.

Example 3

A mixture containing 100 parts polyvinyl butyral, 25 parts ethyl-p-toluene sulfonate, and 25 parts methyl phthalyl ethyl glycollate was homogenized by mixing on a mill at 100° C. It sheeted out to a tough sheet resembling brown crepe rubber in appearance. This was cured by heating in a press for 90 minutes at 120° C. Whereas an uncured sheet of this plasticizer content would be difficult to remove from the mold even after cooling, the thermoplasticity of the cured sheet was enough less that it could be removed from the mold while still warm.

Example 4

A dry reaction was carried out by heating a mixture of 5 grams of polyvinyl butyral and 1.25 grams of ethyl-p-toluene sulfonate for 90 minutes at 80° C. The product was insoluble in the usual solvents for the resin.

What I claim is:

1. The process of curing polyvinyl butyral which comprises heating it with an alkyl-para-toluene sulfonate containing no more than five carbon atoms in the alkyl group until the solubility and thermoplasticity of the polyvinyl butyral have been reduced.

2. A reaction product of polyvinyl butyral and an alkyl-para-toluene sulfonate containing no more than five carbon atoms in the alkyl group, which reaction product has less thermoplasticity and lower solubility in ethylene dichloride than the unreacted polyvinyl butyral.

3. A hard and horny reaction product of polyvinyl butyral and an alkyl-para-toluene sulfonate containing no more than five carbon atoms in the alkyl group, which reaction product is substantially insoluble in ethylene dichloride.

LA VERNE E. CHEYNEY.